(12) United States Patent
Rooney et al.

(10) Patent No.: US 9,655,378 B2
(45) Date of Patent: May 23, 2017

(54) APPARATUS FOR PREPARING POPCORN

(71) Applicant: National Presto Industries, Inc., Eau Claire, WI (US)

(72) Inventors: Seth Rooney, Chippewa Falls, WI (US); Michael R. Berge, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 0 days.

(21) Appl. No.: 14/262,299

(22) Filed: Apr. 25, 2014

(65) Prior Publication Data
US 2015/0305375 A1    Oct. 29, 2015

(51) Int. Cl.
A23L 1/18         (2006.01)
A23L 7/187        (2016.01)

(52) U.S. Cl.
CPC .......... A23L 1/1815 (2013.01); A23L 7/187 (2016.08)

(58) Field of Classification Search
CPC ........ A23L 1/18; A23L 1/1807; A23L 1/1812; A23L 1/1815; A23L 7/161
USPC ................. 99/323.5, 323.7, 323.9, 323.11
See application file for complete search history.

(56) References Cited

U.S. PATENT DOCUMENTS

| | | | |
|---|---|---|---|
| 1,733,301 A * | 10/1929 | Hood | A23L 1/1815 220/264 |
| D193,260 S | 7/1962 | Dewenter | |
| D229,387 S | 11/1973 | Gruber | |
| 4,138,937 A * | 2/1979 | De Weese | A23L 1/1815 219/432 |
| 4,152,974 A | 5/1979 | Tienor | |
| D256,019 S | 7/1980 | Boldt et al. | |
| D259,385 S | 6/1981 | Levin | |
| D260,649 S | 9/1981 | Wondergem | |
| D262,426 S | 12/1981 | Bluestein et al. | |
| D279,069 S | 6/1985 | Goodlaxson | |
| D279,070 S | 6/1985 | Morrison | |
| D279,448 S | 7/1985 | Spoeth, Jr. | |
| 4,538,509 A | 9/1985 | Ojima | |

(Continued)

OTHER PUBLICATIONS

Application and File history for U.S. Appl. No. 29/489,092, filed Apr. 25, 2014. Inventors: Rooney et al.

(Continued)

Primary Examiner — Dana Ross
Assistant Examiner — Brandon Harvey
(74) Attorney, Agent, or Firm — Patterson Thuente Pedersen, P.A.

(57) ABSTRACT

A heated air popcorn popper and related methods of popping popcorn in which unpopped kernels are retained in a heating zone and are prevented from being expelled before they have been exposed to a heated air stream for sufficient time to result in popping of the kernels. The popcorn popper can have a popping portion including a retention mechanism capable of moving in response to physical contact with popped kernels that experience a dramatic volumetric increase in size following popping. As the number of popped kernels within the popping portion increases, the level of the popped kernels rises until they physically contact the retention mechanism, whereby the retention mechanism is forced to transition from a covering disposition to an open disposition in which popped kernels are allowed to exit the heating zone.

12 Claims, 15 Drawing Sheets

(56) References Cited

U.S. PATENT DOCUMENTS

| | | |
|---|---|---|
| D281,137 S | 10/1985 | Cesaroni |
| 4,702,158 A | 10/1987 | Ishihara |
| D294,673 S | 3/1988 | Solomon |
| 4,748,903 A | 6/1988 | Fereshetian |
| D298,202 S | 10/1988 | Levin |
| 4,870,896 A | 10/1989 | Asahina |
| 4,920,760 A | 5/1990 | Muhlack |
| D317,238 S | 6/1991 | Busick |
| D317,838 S | 7/1991 | Millet et al. |
| D325,483 S | 4/1992 | Muhlack |
| D338,800 S | 8/1993 | Duquaine |
| 5,279,213 A | 1/1994 | Miyahara |
| D354,639 S | 1/1995 | Stoddard et al. |
| 5,397,879 A | 3/1995 | Geissler |
| D360,102 S | 7/1995 | Geissler et al. |
| D361,918 S | 9/1995 | Cesaroni et al. |
| 5,481,962 A | 1/1996 | Tedesco |
| 5,501,139 A | 3/1996 | Lee |
| 5,544,573 A | 8/1996 | Gateaud |
| 6,000,318 A * | 12/1999 | Weiss .................. A23L 1/1815 99/323.5 |
| D442,816 S | 5/2001 | Chen |
| RE37,238 E | 6/2001 | Song |
| D461,097 S | 8/2002 | Nemirovsky |
| D551,016 S | 9/2007 | Bond |
| D552,405 S | 10/2007 | Bond |
| D569,677 S | 5/2008 | Poon |
| D607,260 S | 1/2010 | Lam |
| D615,797 S | 5/2010 | Berge et al. |
| D625,604 S | 10/2010 | Zaslow |
| D628,428 S | 12/2010 | Bond |
| D628,847 S | 12/2010 | Liu |
| D632,123 S | 2/2011 | Kauer |
| D633,748 S | 3/2011 | Haskin |
| D642,006 S | 7/2011 | Seymour |
| D645,292 S | 9/2011 | Bond |
| D650,627 S | 12/2011 | Kauer |
| 8,127,565 B1 | 3/2012 | Lange et al. |
| D663,992 S | 7/2012 | Kauer |
| D677,969 S | 3/2013 | Bond et al. |
| D687,666 S | 8/2013 | Mercier |
| 8,931,401 B2 | 1/2015 | Cheung |
| D722,245 S | 2/2015 | Mao |
| D723,320 S | 3/2015 | Rooney et al. |
| D760,011 S | 6/2016 | Berge et al. |
| 2016/0205976 A1 | 7/2016 | Berge |

OTHER PUBLICATIONS

Presto® Hot Air Popper User Manual, 4 pages.
Presto® Stirring Popcorn Popper User Manual, 6 pages.
Presto® PowerPop Microwave Multi-Popper User Manual, 8 pages.
Application and File history for U.S. Appl. No. 29/514,833, filed Jan. 25, 2015. Inventors: Berge et al.

* cited by examiner

APPARATUS FOR PREPARING POPCORN

FIELD OF THE INVENTION

The present invention relates generally to apparatus and methods for preparing popcorn. More specifically, the present invention relates to apparatus and related methods of optimizing popcorn popping performance in popcorn poppers utilizing heated air.

BACKGROUND OF THE INVENTION

Popcorn is one of the most universally consumed snacks. Conventional methods for preparing popcorn have utilized heated oil, microwave heating or heated air as the heating medium. One benefit of utilizing heated air is that the popcorn can control the addition of any extra calories or fat as no oil is utilized in the popping process and the addition of butter and/or other flavors or toppings can be accomplished after the popping process is completed.

One disadvantage of utilizing heated air as the heating medium is the potential for unpopped kernels to be carried out of a heating zone by the heated air thus reducing yields of popped kernels. This is especially true with the various gourmet and premium popcorn kernels that have been developed for today's consumers. Generally, these gourmet and premium popcorn kernels, such as, for example, kernels sold under the Orville Redenbacher brand name, tend to be larger, thus resulting in larger popped kernels. While the larger kernels can result in a large, customer preferred popped kernels, they also require longer exposure to the heating medium to result in popping of the kernel. In poppers that utilize heated air as the heating medium, this can be problematic as the potential exists for unpopped kernels to be blown out of the popping environment before the kernels have been exposed to the heater air for a long enough time that the kernels pop.

Because popcorn poppers that utilize heated air as a medium have many advantages associated with ease of use and the ability to control the nutritional impact of the popcorn itself, it would be advantageous to find ways to increase the popping yield of kernels that are placed into such a popcorn popper.

SUMMARY OF THE INVENTION

A heated air popcorn popper of the present invention addresses the current deficiencies of conventional heated air popcorn poppers by providing a retention mechanism or means for retaining unpopped popcorn kernels in a heating zone, whereby the unpopped popcorn kernels are prevented from being expelled from the heating zone before they have been exposed to a heated air stream for sufficient time to result in popping of the kernels. Generally, the retention mechanism or means for retaining functions as a yieldable cover or covers capable of moving in response to physical contact with popped kernels that experience a dramatic volumetric increase in size following popping. As the number of popped kernels increases, the popped kernels begin to occupy all of the available space within the heating zone until eventually, the level of the popped kernels rises and physically contact the yieldable cover, whereby the yieldable cover begins to transition from a covering disposition to an open disposition in which popped kernels are allowed to exit the heating zone.

In one aspect, the present invention is directed to a popcorn popper having a popping portion with an upper opening. The popping portion can be filled by pouring unpopped popcorn kernels though the upper opening. The popping portion can include a means for retaining or lid member attached to the upper opening. During popping, a hot air stream can be blown upward through the popping portion such that the unpopped popcorn kernels are heated and are ultimately popped to form popped kernels. During heating of the unpopped popcorn kernels, the means for retaining or lid member prevents the hot air stream from blowing the unpopped popcorn kernels out of the popping portion. As the number of popped kernels increases, the volume of popped kernels increases to the point where the popped kernels begin to fill the popping portion and come into physical contact with the means for retaining or lid member. When the volume of popped kernels fills the popping portion to the means for retaining or lid member, the means for retaining or lid member is physically caused to transition from a covering disposition to an open disposition whereby the popped kernels can be blown out of the popping portion by the hot air stream. In this manner, unpopped kernels are prevented from exiting the popping portion until they have been exposed to the hot air stream for a period of time long enough to cause popping.

In another aspect, the present invention is directed to a method for increasing kernel popping in a popcorn popper. The method can comprise filling a popping portion of a popcorn popper with a plurality of unpopped kernels. The method can further comprise supplying heated air though the popping portion so as to cause the unpopped kernels to pop and fill the volume of the popping portion with popped kernels. The method can further comprise retaining the unpopped kernels within the popping portion with a means for retaining or lid assembly mounted on an upper opening of the popping portion that transitions from a covering disposition to an open disposition once the popping portion is filled with popped kernels.

In yet another aspect, the present invention can comprise a hot air popper having a popping portion though which a heated air stream is directed. The popping portion can include an upper opening to which a means for retaining or lid assembly is mounted to retain unpopped kernels within the popping portion. The means for retaining or lid assembly can transition between a covering disposition and an open disposition in response to contact with popped kernels as the volume of popped kernels fills the popping portion. In one representative embodiment, the means for retaining or lid assembly can comprise a plurality of lid members that are hingedly attached to the upper opening such that the lid members can rotate between the covering disposition and the open disposition. In another representative embodiment, one or more of the lid members can include a stop member that limits a rotation range of the corresponding lid member to limit a travel amount of the lid member in the open disposition so as to provide resistance to the popped kernels as they fill and exit the popping portion.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

A specific embodiment is now described by way of example to further the understanding of the present disclosure, with reference to the accompanying drawings in which.

Figure 1:
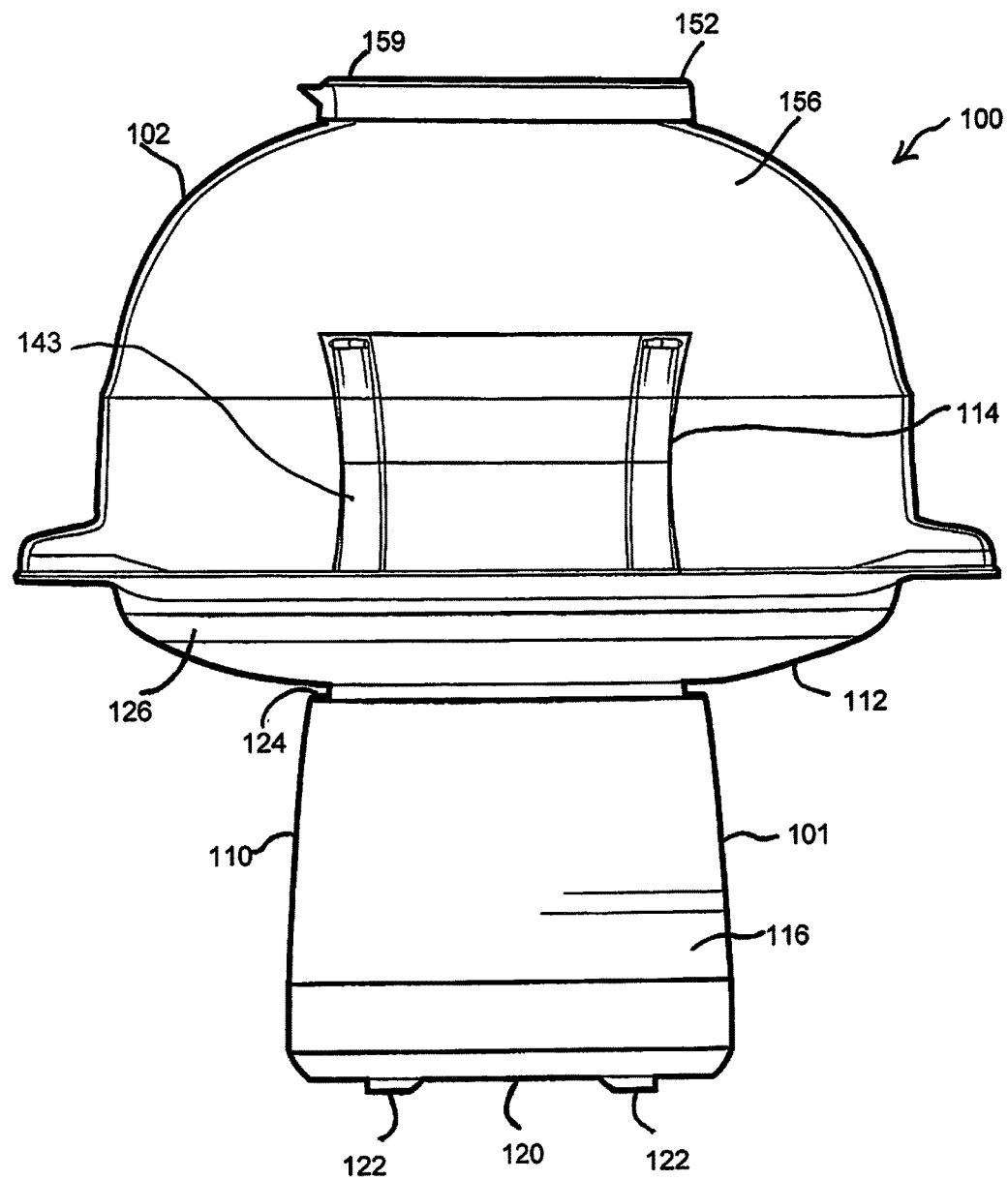
FIG. 1 is a front view of a popcorn popper according to a representative embodiment of the present invention.
Figure 2:
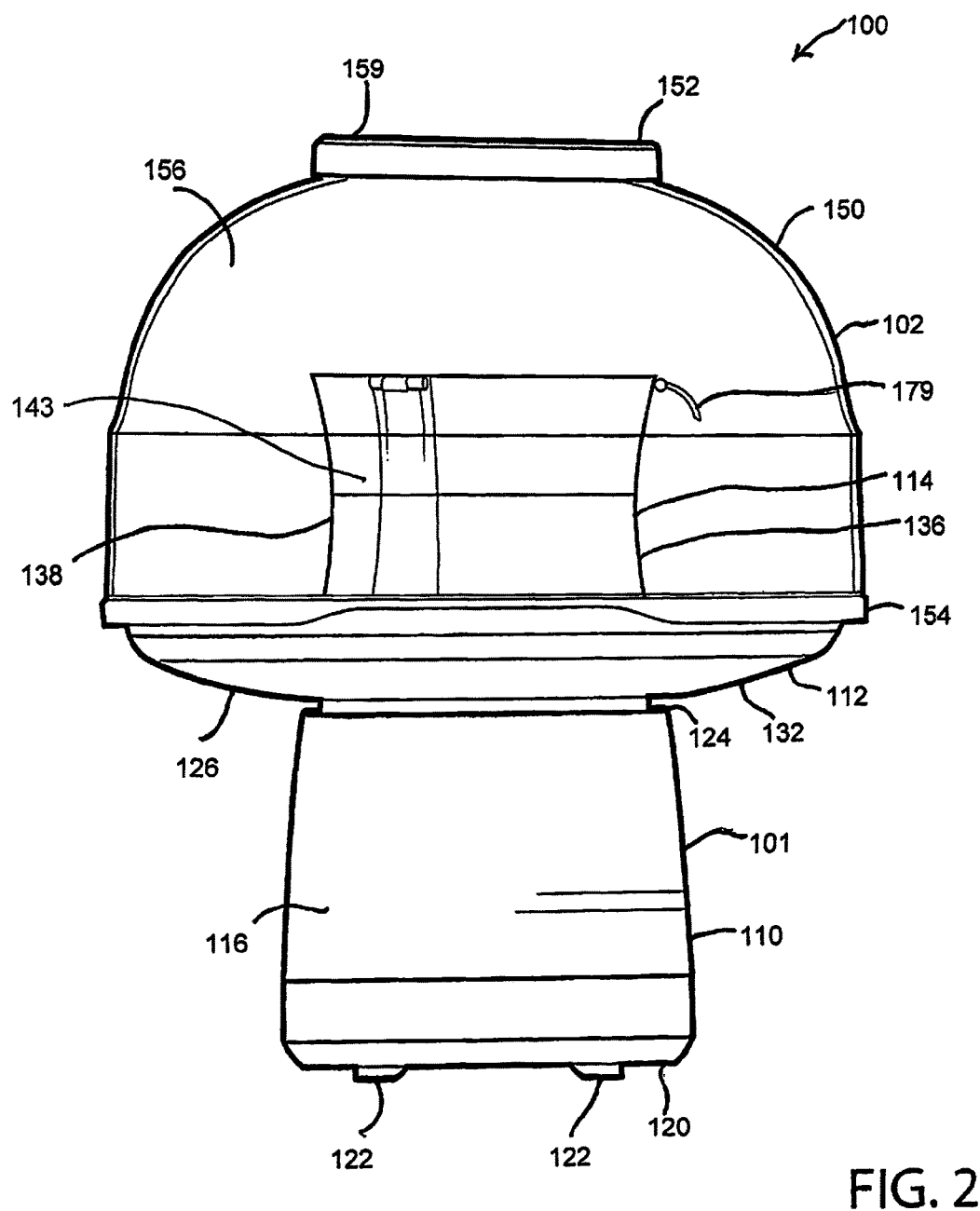
FIG. 2 is a side view of the popcorn popper of FIG. 1.
Figure 3:
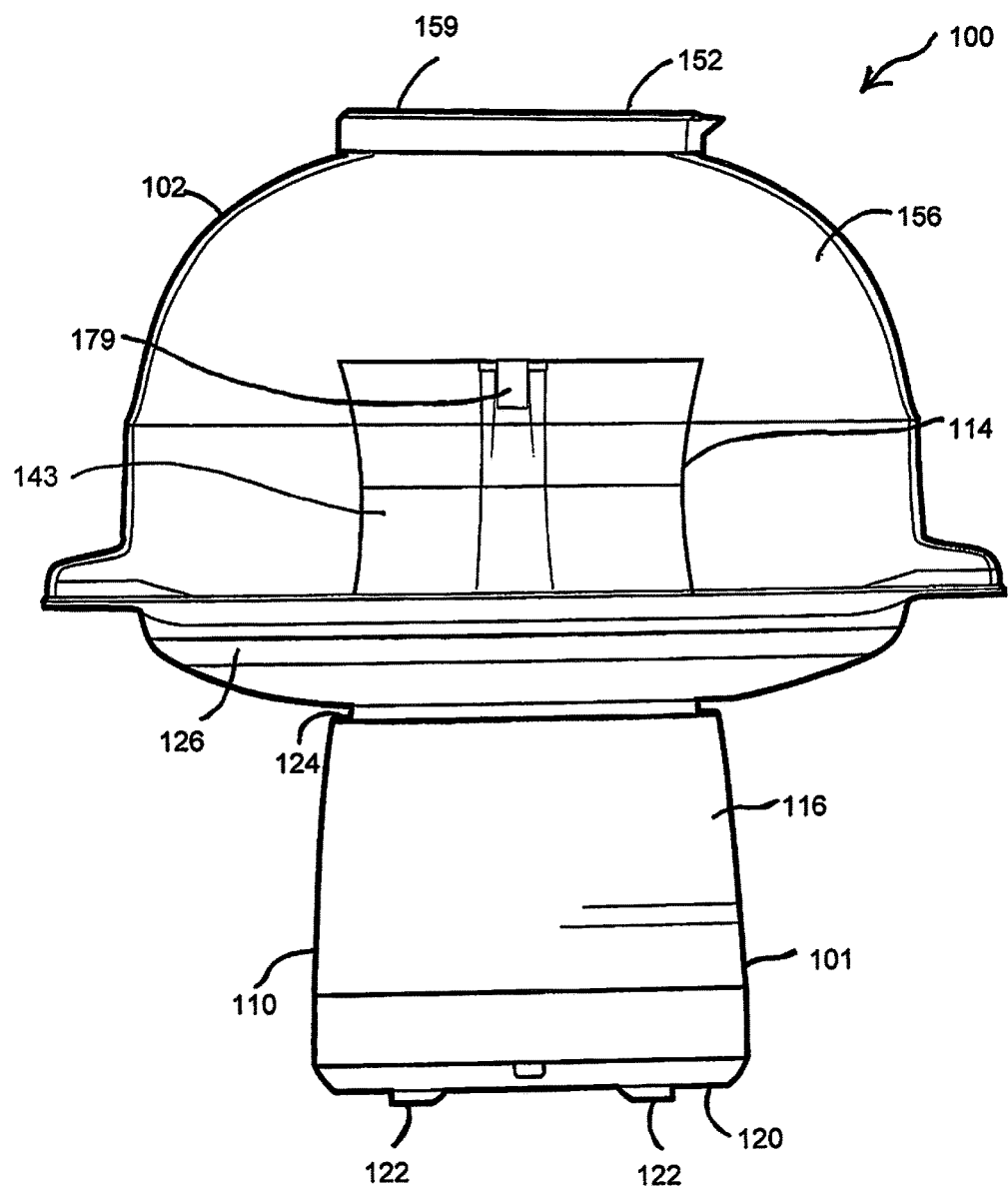
FIG. 3 is a rear view of the popcorn popper of FIG. 1.
Figure 4:
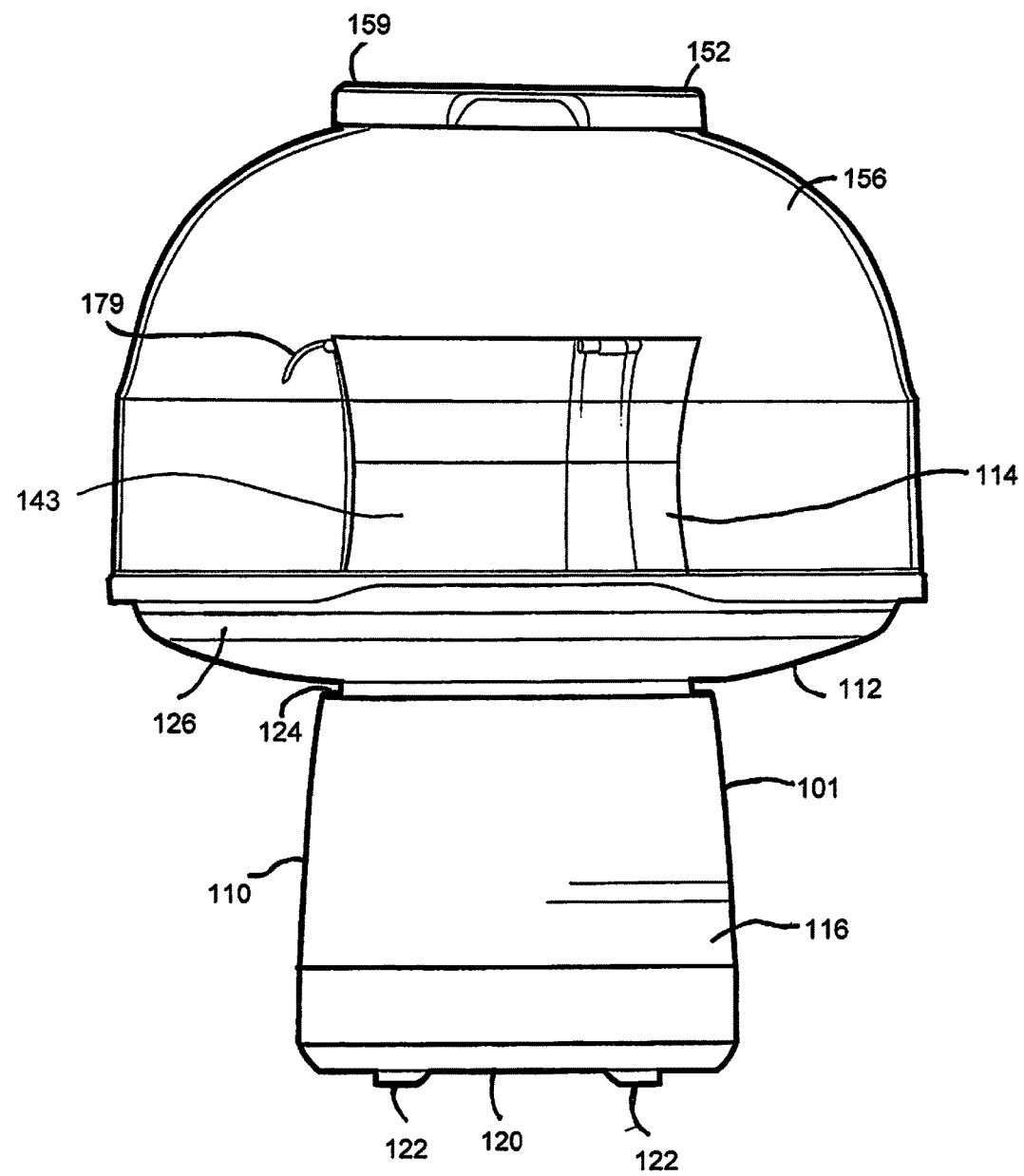
FIG. 4 is a side view of the popcorn popper of FIG. 1.
Figure 5:
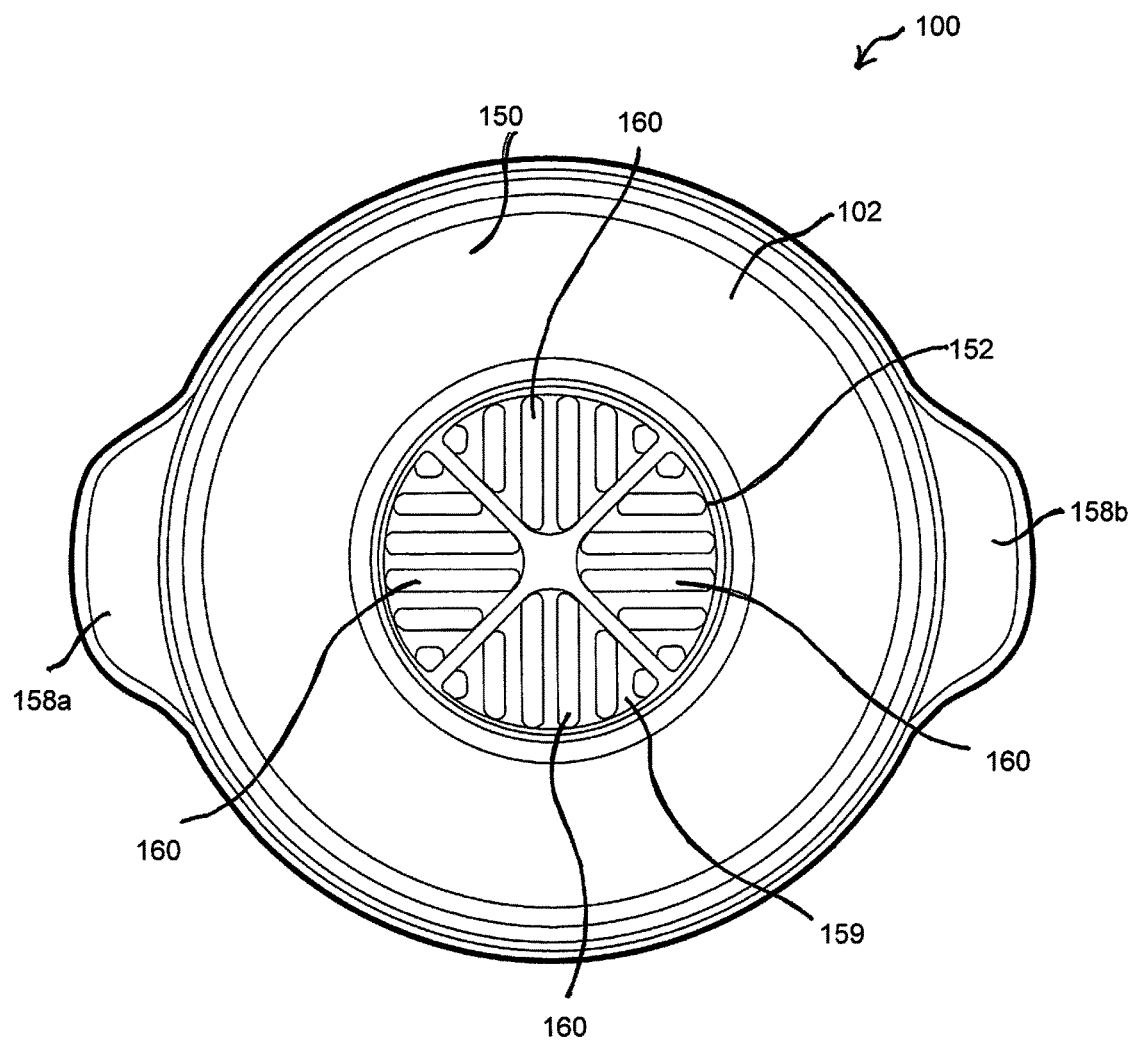
FIG. 5 is a top view of the popcorn popper of FIG. 1.
Figure 6:
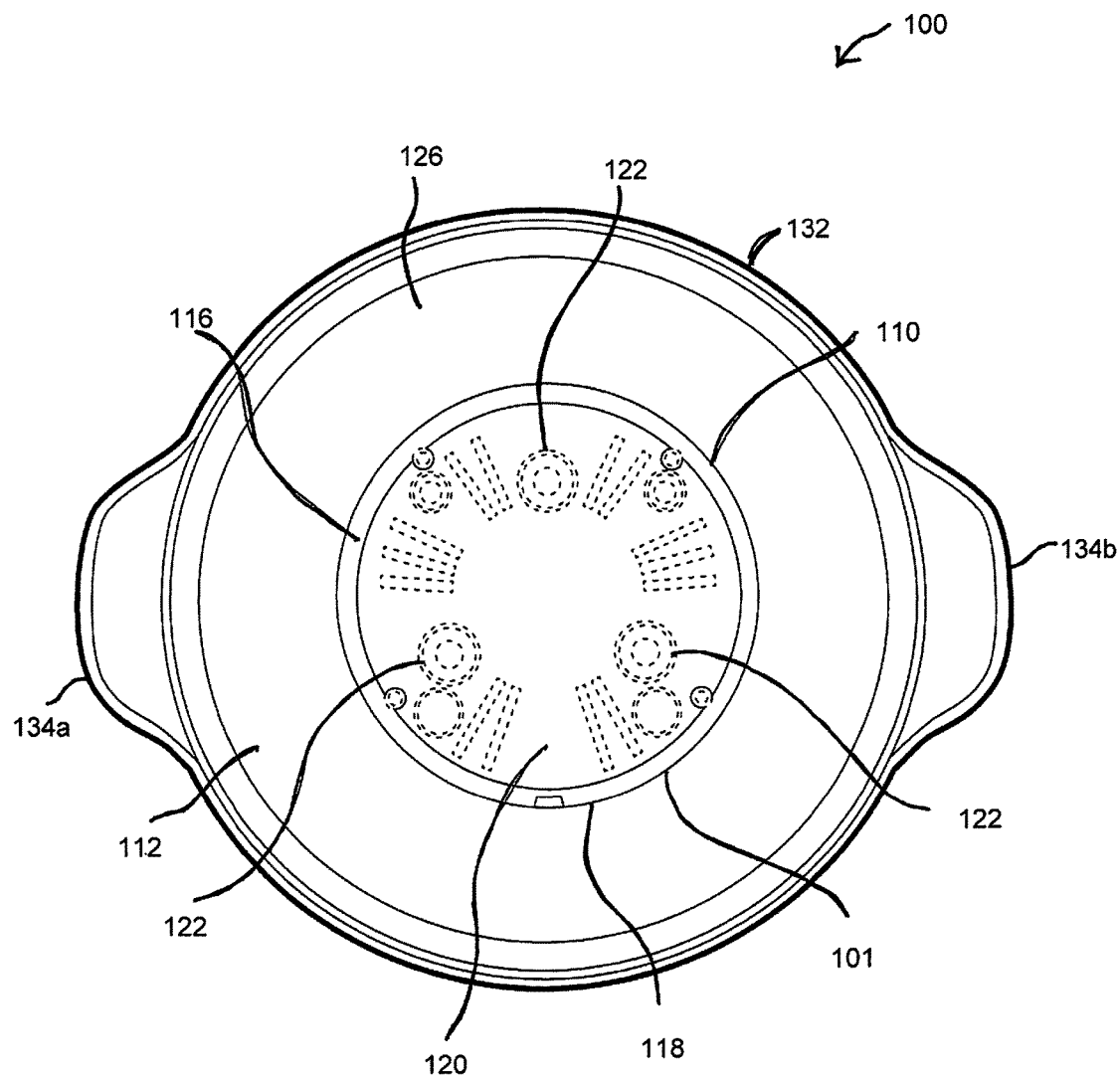
FIG. 6 is a bottom view of the popcorn popper of FIG. 1.
Figure 7:
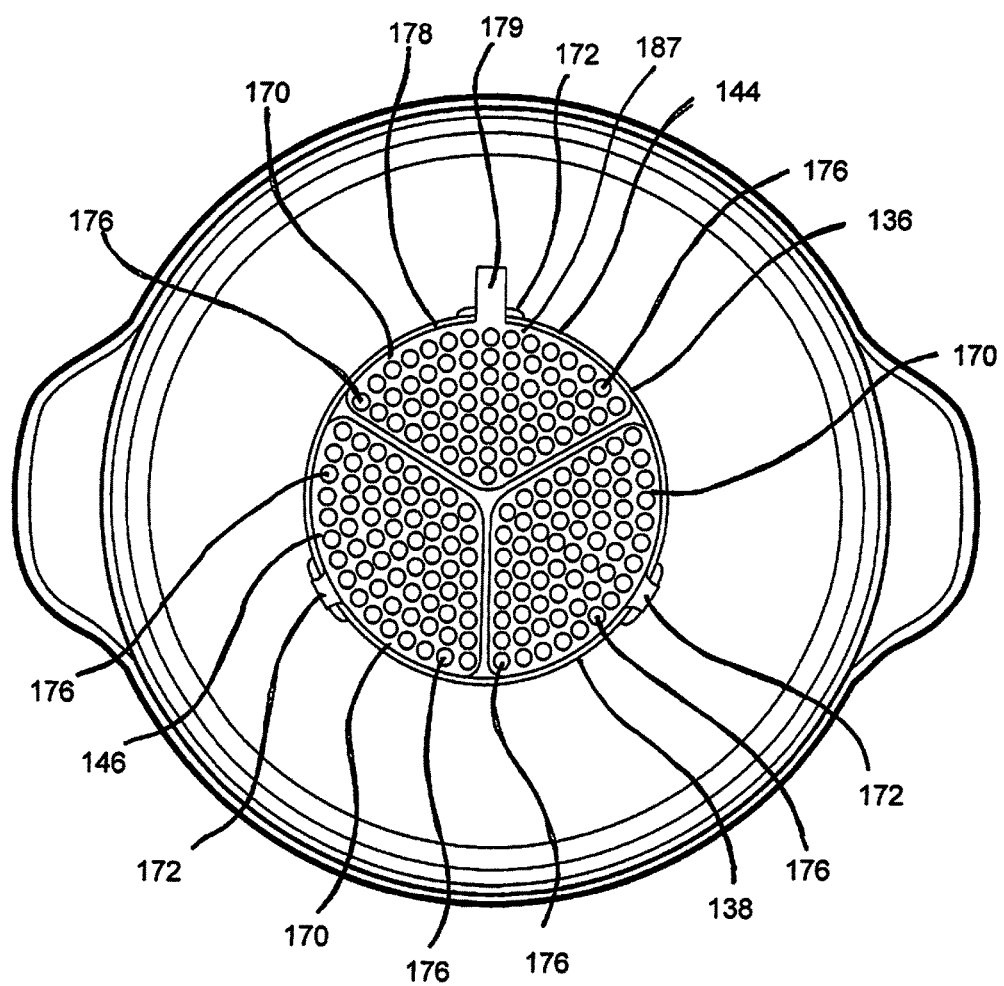
FIG. 7 is a top view of a base assembly according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring generally to FIGS. 1-6, 9, 10 and 12-15, a representative embodiment of a popcorn popper 100 of the present invention comprises a base assembly 101 and a cover assembly 102. Generally, popcorn popper 100 is fabricated of materials suitable for contact with food for consumption and that can be easily cleaned and/or sanitized. In addition, the materials used to fabricate popcorn popper 100 should be compatible with elevated temperatures necessary for causing popcorn kernels to pop. Generally, covers assembly 102 can be fabricated of suitable polymeric materials while base assembly 100 can comprise one of or a combination of suitable materials such as, for example, polymeric materials and or various metals such as, stainless steel and the like.

With reference to FIGS. 1-4, 6, 9 and 10, base assembly 101 generally comprises a base member 110, a dish portion 112 and a popping portion 114. Base member 110 can have an exterior base wall 116 having a desired shape such as, for example, a round configuration 118 or alternatively, square, rectangular, triangular and combinations thereof. Base member 110 comprises a base floor 120 that include a plurality of feet 122 to elevate the base floor 120 above a surface on which the base member 110 is positioned. Base member 110 defines an internal mounting space 119 so as to provide room for mounting the various controls and electrical mechanisms need to promote the popping of popcorn kernels including, for example, a fan assembly 121, a motor 123 and a heater (not shown). Though not specifically identified, it will be understood that necessary electrical controls for safe and controlled operation of the popcorn popper 100 are included within the base assembly 101.

As seen in FIGS. 1-4, 8, 9 and 10, dish portion 112 is coupled to the base member 110 at an upper base surface 124. Dish portion 112 generally includes an exterior dish surface 126 and an interior dish surface 128 that extend outwardly and terminate at an upper dish surface 130. The exterior dish surface 126 can have a generally rounded or tapered appearance between the upper base surface 124 and the upper dish surface 130. Dish portion 112 generally defines a dish perimeter shape 132 such as, for example, the illustrated circular dish perimeter shape though it will be understood that dish perimeter shape 132 can have other suitable configurations including, for example, square, rectangular, triangular and combinations thereof. Upper dish surface 130 defines a plurality of dish handles 134a, 134b.

As seen in FIGS. 1-4 and 7-12, popping portion 114 generally comprises a popping body 136 extending upward from the interior dish surface 128. The popping body 136 is generally defined by a popping wall 138 defining an upper wall opening 140, an internal heating zone 142 and an exterior surface 143. The popping body 136 can have a circular cross-section 144 as illustrated or alternatively, the popping body 136 can have a cross-sectional shape selected from squares, rectangles, triangles and combinations thereof. Popping body 136 further comprises a kernel retention mechanism 146 or means for retaining at the upper wall opening 140. Popping body 136 generally includes a popping floor 148 formed of a mesh or screen material having apertures significantly reduced in size compared to individual popcorn kernels.

Figure 10:
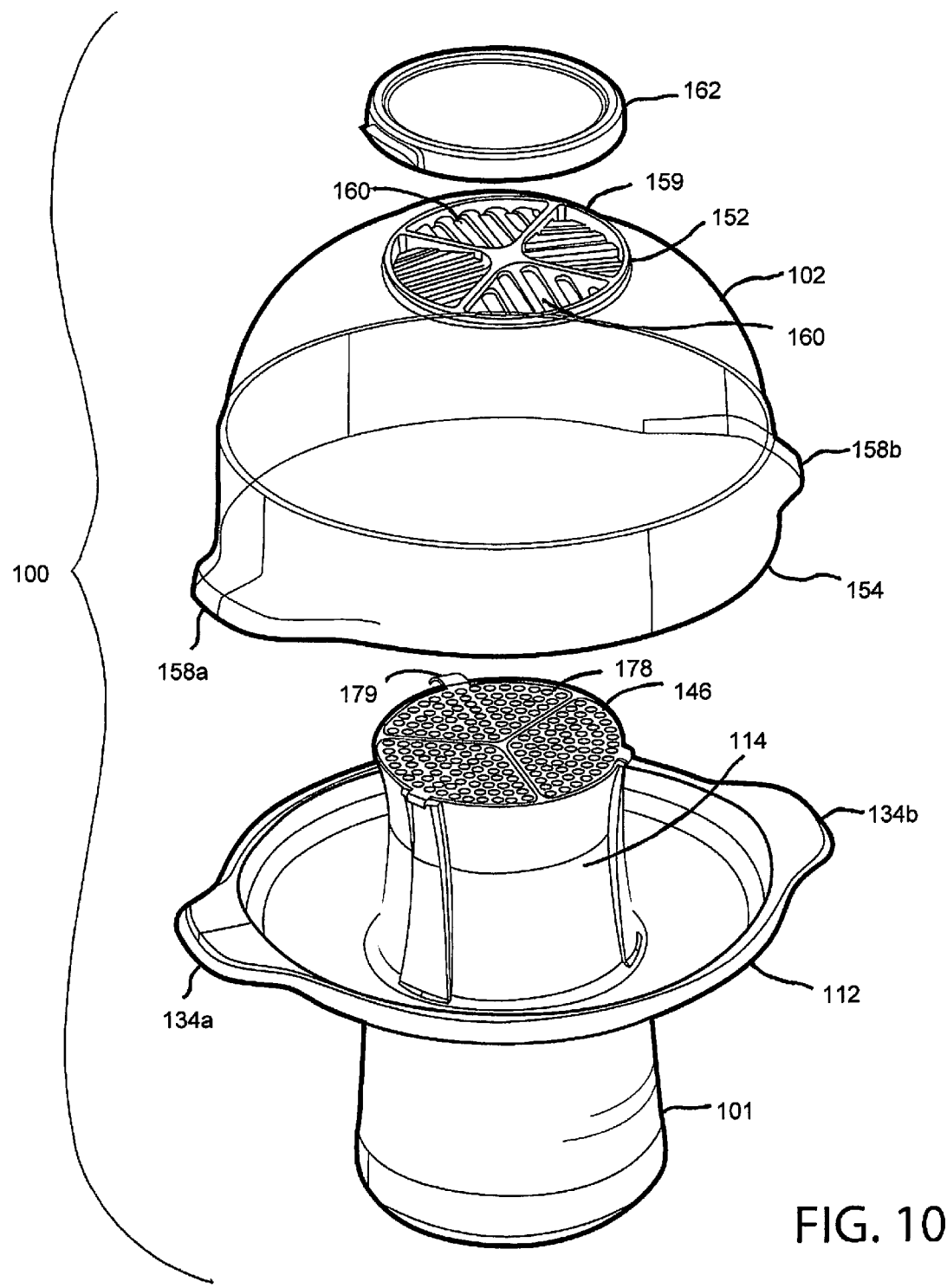
FIG. 10 is an exploded, perspective view of the popcorn popper of FIG. 1.

With reference to FIGS. 1-5, 9 and 10, cover assembly 102 generally has a domed perimeter surface 150 defined between an upper vent assembly 152 and a lower cover surface 154. The lower cover surface 154 generally is shaped so as to set onto and to interface with the upper dish surface 130 such that an enclosed area 156 is defined by the cover assembly 102 and the dish portion 112. The lower cover surface 154 can include a plurality of cover handles 158a, 158b that correspond to and interface with the dish handles 134a, 134b. Upper vent assembly 152 generally comprises a raised vent surface 159 surrounding a plurality of individual vent holes 160. As illustrated, vent holes 160 can have an elongated shape or alternatively, can possess other suitable shapes such as, for example, circular, square, triangular and combinations thereof. Preferably, cover assembly 102 is fabricated so as to have a transparent appearance. As seen in FIG. 10, cover assembly 102 can further comprise a vent cover 162 that is configured to snap fit over the raised vent surface 159.

Figure 8:
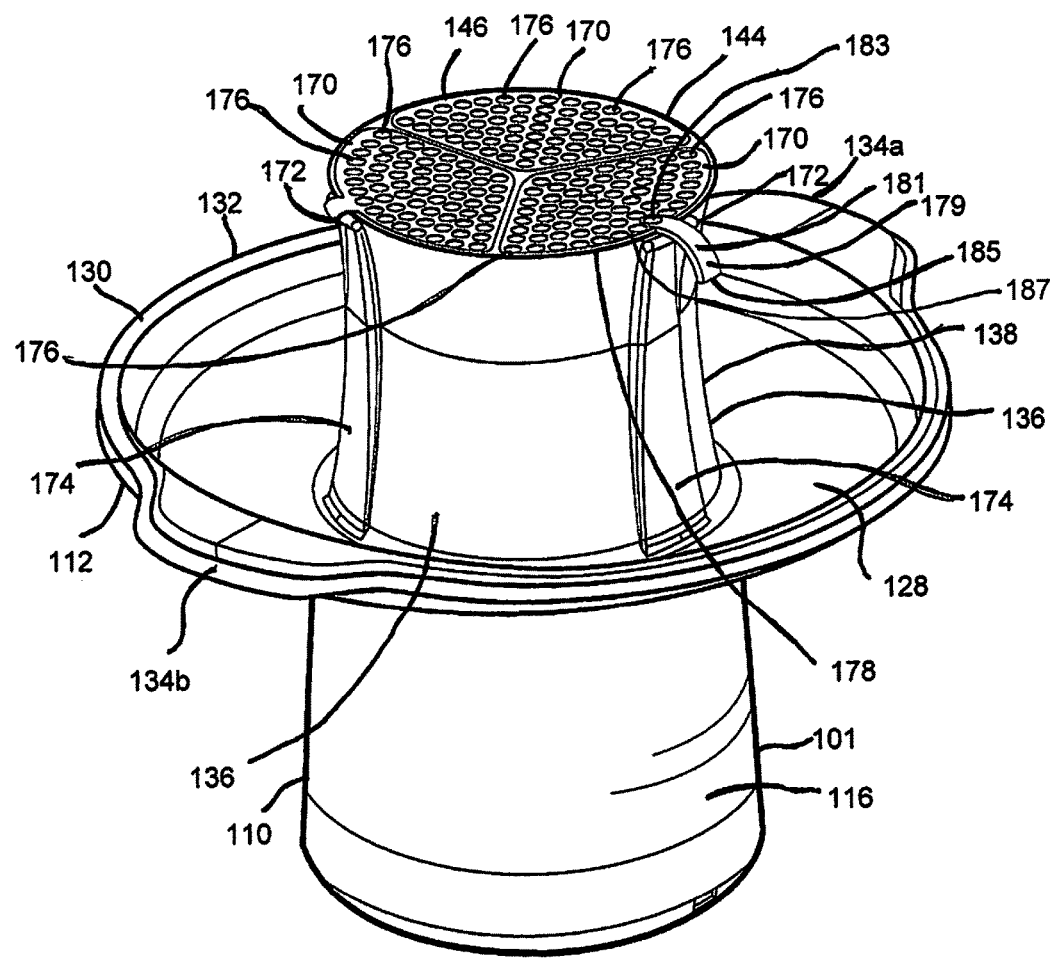
FIG. 8 is a perspective view of the base assembly of FIG. 7.
Figure 9:
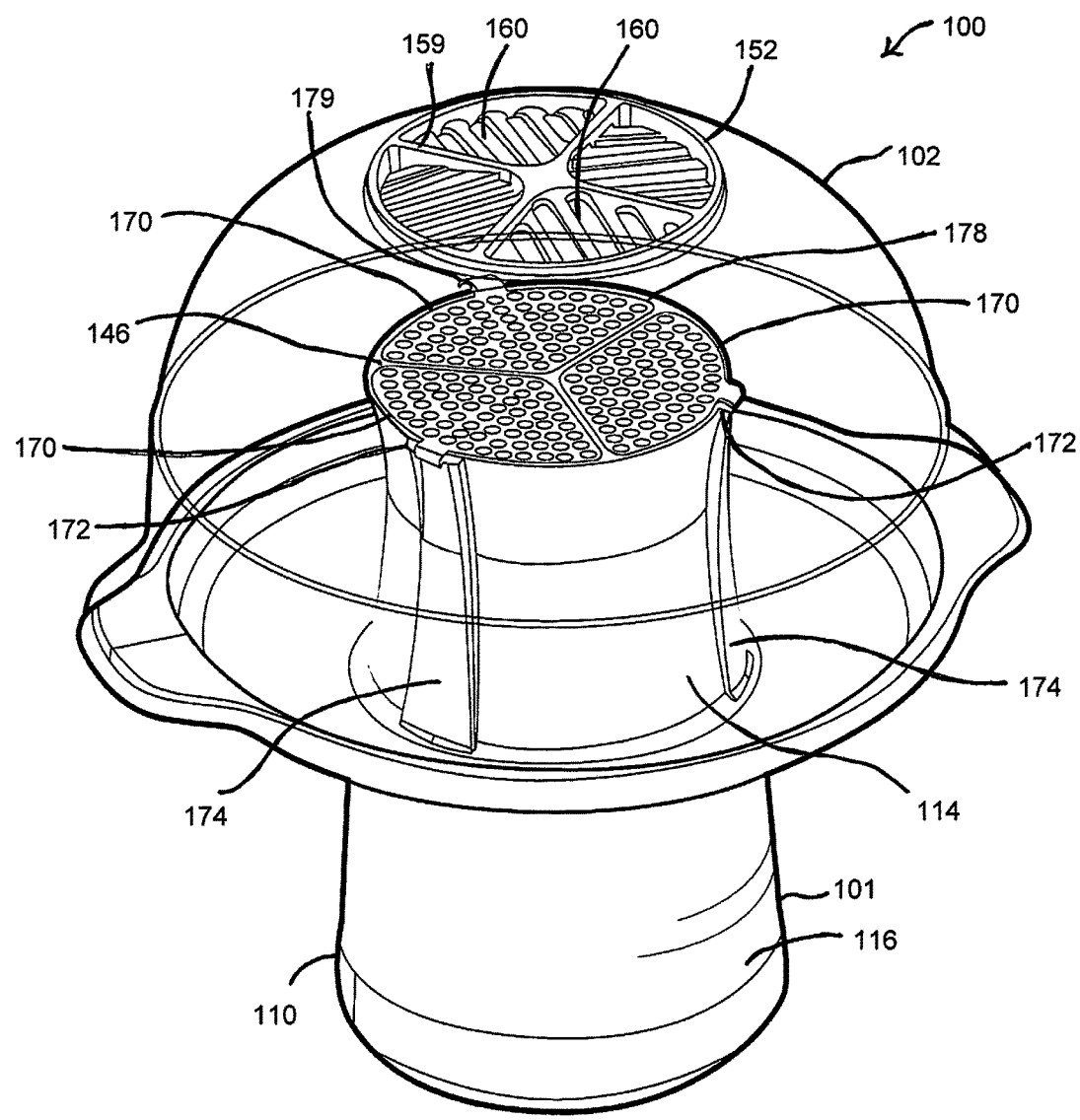
FIG. 9 is a perspective view of the popcorn popper of FIG. 1.
Figure 11:
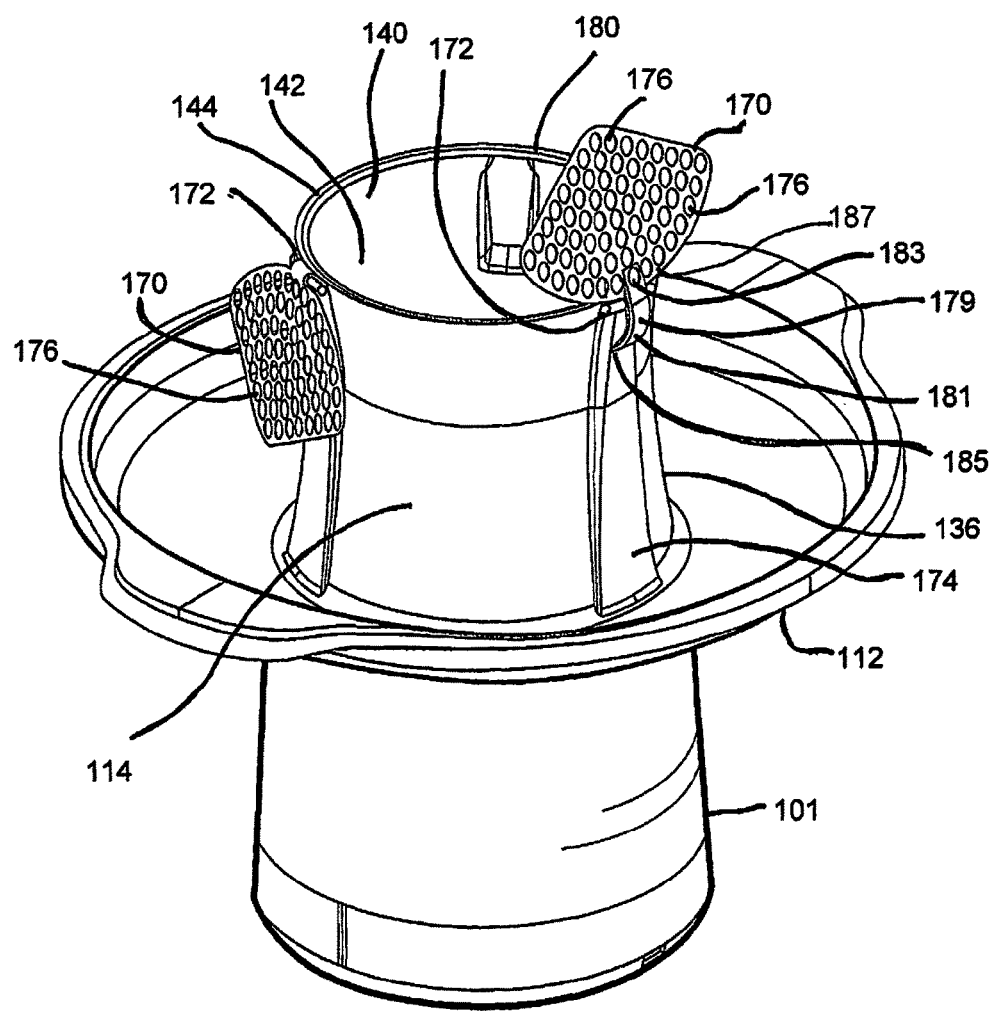
FIG. 11 is a perspective view of the base assembly of FIG. 7 with a retention mechanism in an open disposition.
Figure 12:
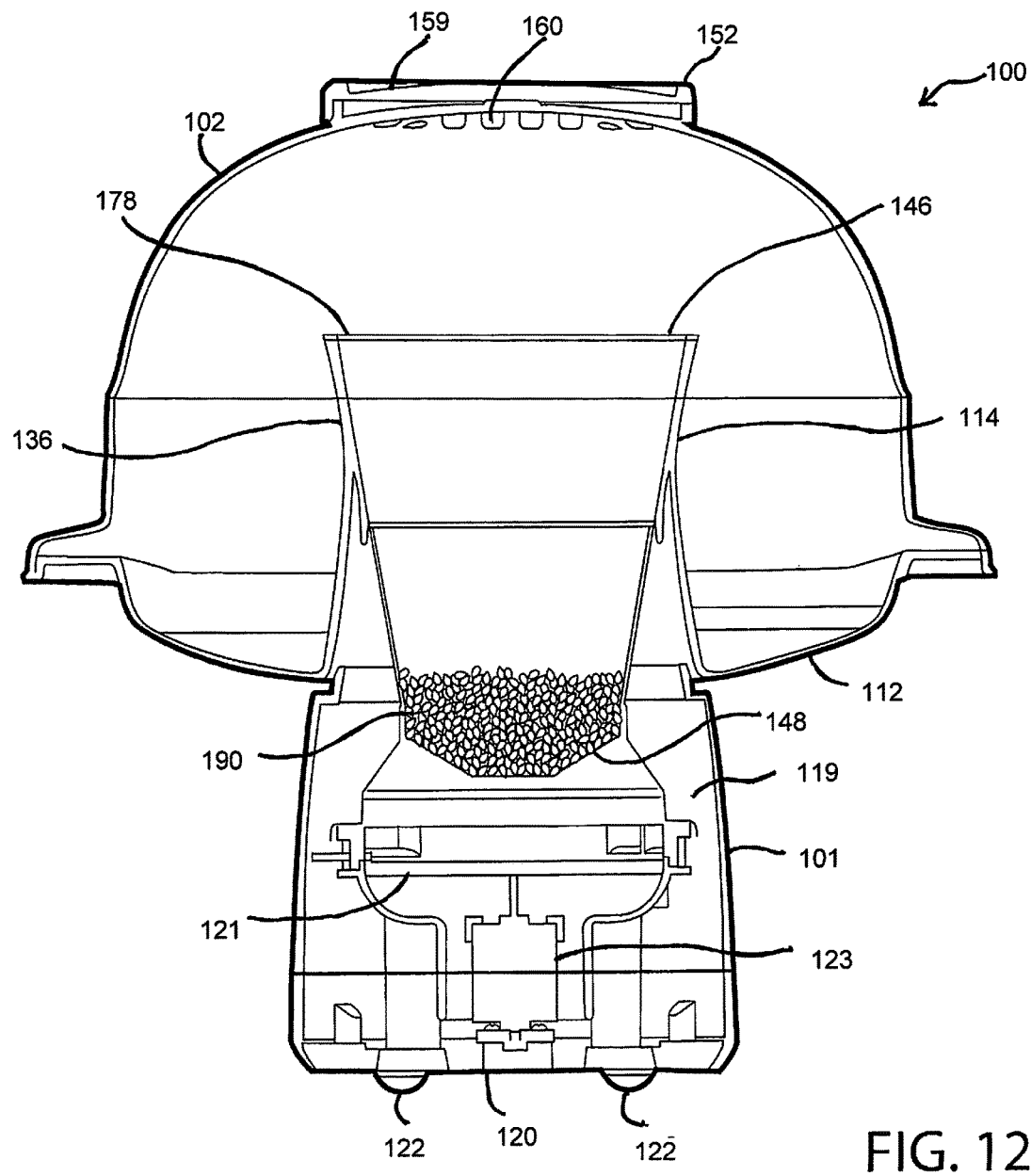
FIG. 12 is a section view of the popcorn popper of FIG. 1 with a popping portion filled with unpopped popcorn kernels and wherein a retention mechanism is in a covering disposition.
Figure 13:
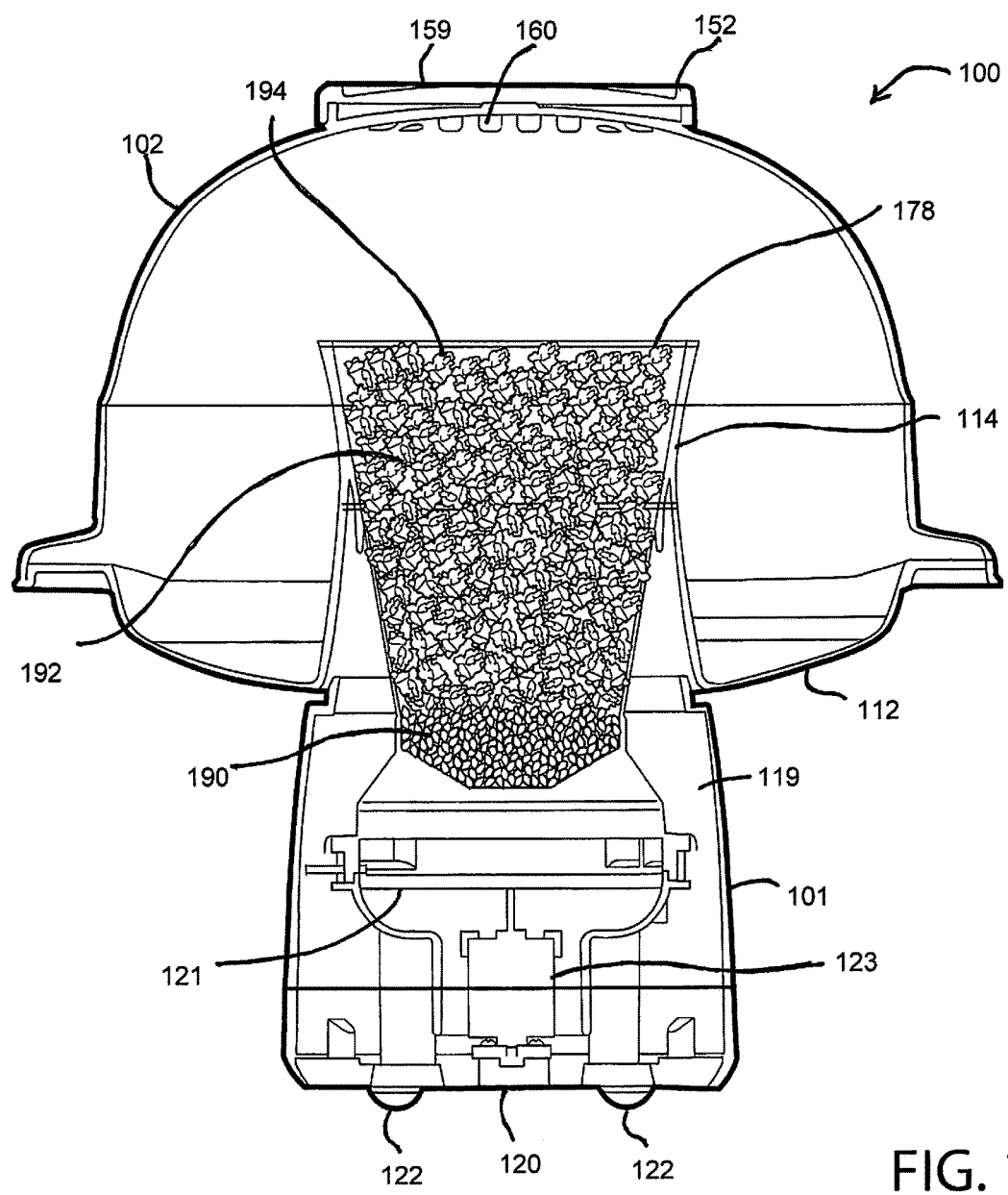
FIG. 13 is a section view of the popcorn popper of FIG. 1 with a popping portion filled with both unpopped popcorn kernels and popped popcorn kernels and wherein a retention mechanism is in a covering disposition.
Figure 14:
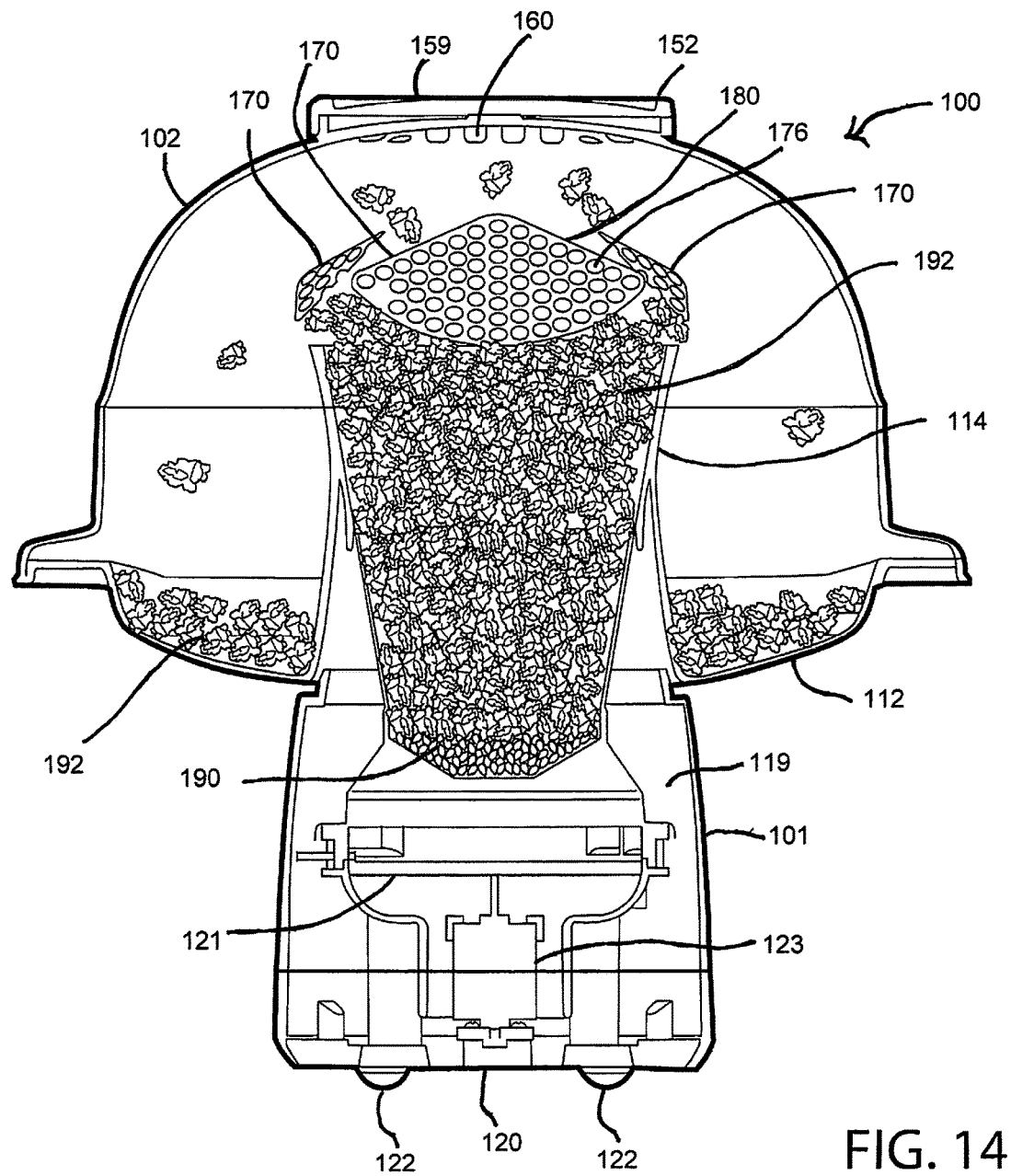
FIG. 14 is a section view of the popcorn popper of FIG. 1 with a popping portion filled with both unpopped popcorn kernels and popped popcorn kernels and wherein the popped popcorn kernels have caused a retention mechanism to transition to an open disposition.
Figure 15:
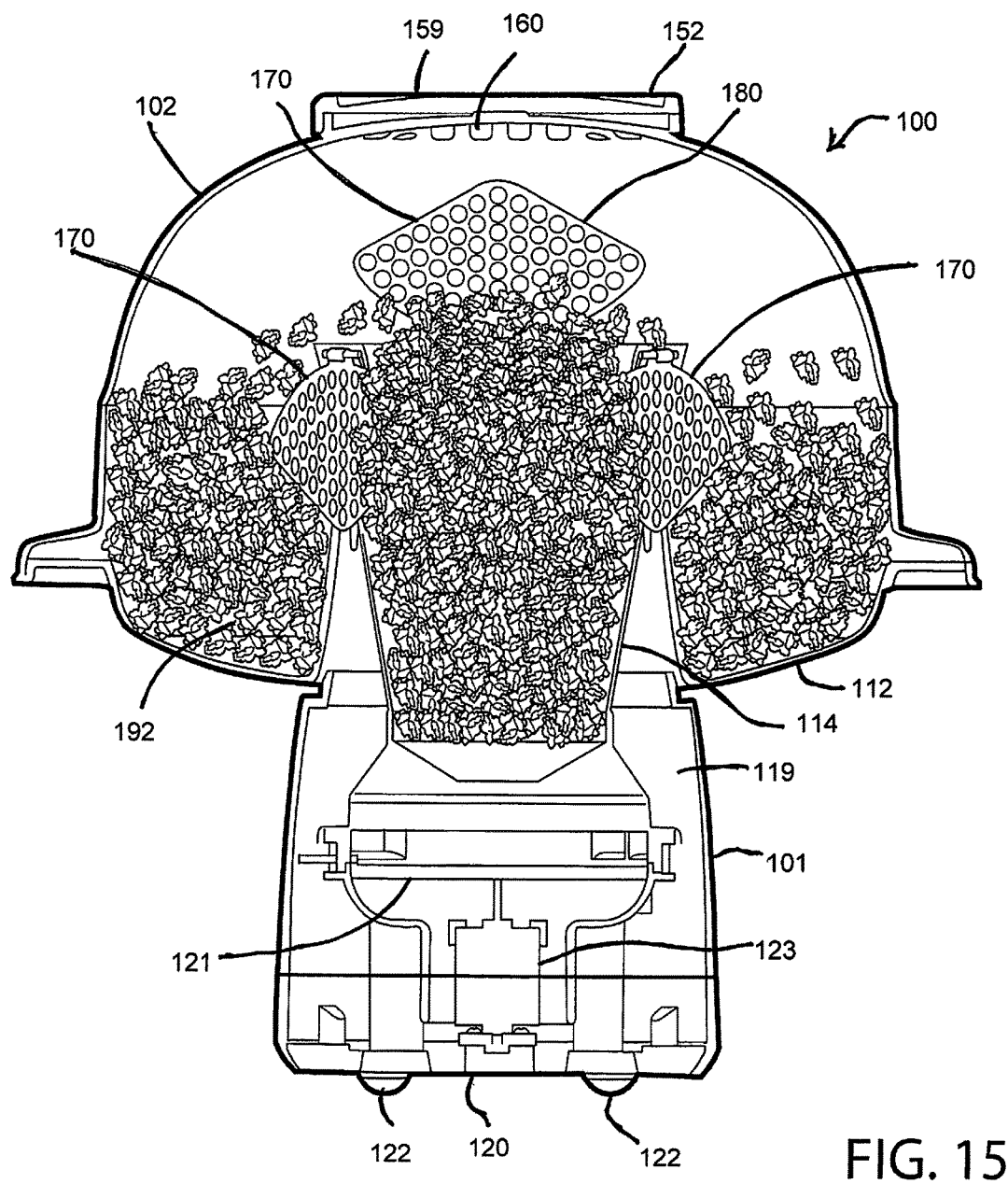
FIG. 15 is a section view of the popcorn popper of FIG. 1 with a popping portion filled with popped popcorn kernels and wherein the popped popcorn kernels have caused a retention mechanism to transition to an open disposition.

Referring specifically to FIGS. 7-10, kernel retention mechanism 146 generally comprises at least one lid member 170 that is attached to upper wall opening 140 with a corresponding hinge assembly 172. In order to provide additional structure and support for mounting each hinge assembly 172, a corresponding hinge rib 174 can be positioned along the popping wall 138. Lid member 170 generally covers the entire upper wall opening 140. Lid member 170 can comprise two or more lid members 170, such as, for example, three lid members 170 as illustrated with the only requirement being that in combination, the lid members 170 cover the entire wall opening 140. Each lid member 170 includes a plurality of lid vent openings 176. Each lid member 170 has a corresponding hinge member 172 such that the lid members 170 are individually capable of transitioning between a covering disposition 178 as seen in FIGS. 7-10, 12 and 13 and an open disposition 180 as seen in FIGS. 11, 14 and 15. In some embodiments, at least one lid member 170 can further comprise a limit stop member 179 to physically restrict the opening range of the corresponding lid member 170. As seen in FIG. 8, stop member 179 can comprise a curved body 181 having an attachment end 183 and a stop end 185, with the stop member 179 projecting from an upper surface 187 of the corresponding lid member 170.

Assembly and use of the popcorn popper 100 is generally illustrated within FIGS. 11-15. First, cover assembly 102 is removed from the base assembly 101 such that the popping portion 114 is accessible to a user. Next, the user manipulates the kernel retention mechanism 146 to the open disposition 180, for example, by flipping each lid member 170 to the open disposition 180, such that upper wall opening 140 is exposed. The user then pours a desired amount of popcorn kernels 190 into the internal heating zone 142 such that they are positioned above the popping floor 148. The user then manipulates the kernel retention mechanism 146 to the covering disposition 178, for example, by flipping each lid member 170 to the covering disposition 178, such that the popcorn kernels 190 are enclosed within the internal heating zone 142. With the popcorn kernels 190 positioned within the popping portion 114, the user then places the cover assembly 102 on top of the dish portion 112 such that the lower cover surface 154 rests on the upper dish surface 130 with the corresponding cover handle 158a, 158b positioned over the corresponding dish handle 134a, 134b.

With the popcorn popper 100 reassembled and having popcorn kernels 190 positioned in the popping portion 114, the user plugs in an electrical cord (not shown) and utilizes the controls to begin a popping cycle. Generally, the resistance heater heats air that is in turn directed upward with by the fan assembly 121. The heated air enters the popping portion 114 through the popping floor 148, whereby the heated air interacts with the popcorn kernels 190. Generally, the popcorn kernels 190 are agitated by the heated air and can even be carried upward by the heated air. Any popcorn kernel 190 that is blown upward eventually contacts the kernel retention mechanism 146, which prevents the popcorn kernel 190 from exiting the heating zone 142. After a period of time, the popcorn kernels 190 begin reaching an internal temperature of at least 185° C., whereby moisture within the popcorn kernels 190 is converted to steam, thus causing the popcorn kernel 190 to "pop" and become a popped kernel 192. Each popped kernel 192 is substantially larger following popping, thereby causing the internal heating zone 142 to become filled with popped kernels 192. As the popped kernels 192 accumulate and stack upon one another, eventually an upper level 194 of the popped kernels 192 reaches the kernel retention mechanism 146. As the upper level 194 contacts the kernel retention mechanism 146, the kernel retention mechanism 146 is physically forced upward and caused to transition from the covering disposition 178 to the open disposition 180, for example, by causing each lid member 170 to flip from the covering disposition 178 to the open disposition 180. As the kernel retention mechanism 146 transitions to the open disposition 180, the heated air blows upward through the upper wall opening 140 such that the popped kernels 192 begin exiting the internal heating zone 142 and begin to accumulate on the interior dish surface 128 of the dish portion 112. If lid member 170 includes a stop member 179, the stop member 179 limits a travel amount of the individual lid member 170 and essentially provides resistance or "back pressure" to the stack of popped kernels 192 that prevents all of the popped kernels from blowing out of the internal heating zone 142 at the same time and insuring that resistance remains in place to hold any remaining popcorn kernels 190 in the popping portion 114 until they have popped. As seen in FIG. 11, as the lid member 170 rotates from the covering disposition 178 to the open disposition 180, stop end 185 abuts and comes into physical contact with popping body 136 to prevent further rotation of the lid member 170. The curved body 181 of the stop member can serve to limit the travel amount of the lid member to about 90° or less as defined between an upper opening plane and a lid member plane to apply resistance to the popped kernels 192 being blown out of the internal heating zone 142. By providing a physical barrier that prevents the egress of popcorn kernels 190 from the popping portion 114 until they have popped and become popped kernels 192, the overall efficiency of the popping process and of popcorn popper 100 is increased.

While a specific embodiment has been described above by way of illustration, it will be appreciated that the described principles are equally applicable to a wide range of popcorn popper products and configurations. More generally, numerous adaptations, modifications, combinations and juxtapositions of the features described above may be made without departing from the principles of the presently disclosed invention.

The invention claimed is:

1. A popcorn popper, comprising: a base assembly including a popping portion defined by a popping wall that defines an internal heating zone and an upper wall opening, the popping portion including a kernel retention mechanism having at least one lid member, the lid member having an upper surface including a limit stop member which comprises an attachment end attached to the lid member and a free end, the lid member hingedly attached to the popping wall about an exterior of the upper opening on the popping portion such that the lid member is rotatable between a covering disposition in which the upper opening is covered by the lid member and an open disposition in which at least a portion of the upper opening is uncovered by the lid member and the lid member rotates until the free end of the limit stop member comes into contact with an exterior surface of the popping wall.

2. The popcorn popper of claim 1, wherein the kernel retention mechanism includes a plurality of lid members, each lid member being individually hingedly attached to the popping wall about the exterior of the upper opening, wherein each lid member is individually rotatable between the covering disposition and the open disposition, and wherein at least one of the lid members includes the limit stop member.

3. The popcorn popper of claim 2, wherein the limit stop member interfaces with the exterior surface of the popping wall to limit a travel amount of the corresponding lid member between the covering disposition and the open disposition.

4. The popcorn popper of claim 3, wherein the travel amount is equal to or less than a 90 degree angle defined between an upper opening plane and a lid member plane.

5. The popcorn popper of claim 1, wherein the at least one lid member includes a plurality of lid openings, said lid openings adapted to allow air flow through the lid member with the lid member in the covering disposition.

6. The popcorn popper of claim 5, wherein the at least one lid member is adapted to transition from the covering disposition to the open disposition in response to contact with popped kernels within the popping portion.

7. A popcorn popper, comprising: a base assembly including a popping portion defined by a popping wall that defines an internal heating zone and an upper wall opening, the popping portion including a lid assembly for retaining unpopped kernels within the popping portion, the lid assembly for retaining unpopped kernels mounted to an exterior of the upper wall portion such that the lid assembly for retaining unpopped kernels transitions between an initial covering disposition and an open disposition in which the lid assembly for retaining unpopped kernels rotates until a limit stop member, which comprises an attachment end attached to the lid member and a free end, attached on the lid assembly for retaining unpopped kernels contacts an exterior surface of the popping wall and popped kernels are released into a dish portion.

8. The popcorn popper of claim 7, wherein the lid assembly for retaining unpopped kernels comprises at least one lid member that is hingedly attached to the exterior of the upper wall opening of the popping portion.

9. The popcorn popper of claim 8, wherein the lid assembly comprises a plurality of lid members, each lid member being individually hingedly attached to the exterior of the upper wall opening.

10. The popcorn popper of claim 9, wherein at least one of the lid members includes the limit stop member mounted to an upper surface of the at least one lid member, the limit stop member interfacing with the exterior surface of the popping wall to restrict a maximum rotation angle of the at least one lid member.

11. The popcorn popper of claim 10, wherein the maximum rotation angle is limited from 0 degrees to 90 degrees.

12. The popcorn popper of claim 7, wherein the means for retaining unpopped kernels further comprises a means for venting a heated air stream from the popping portion.

* * * * *